(12) United States Patent
Kugler

(10) Patent No.: US 6,792,016 B2
(45) Date of Patent: Sep. 14, 2004

(54) COOLED MIRROR DEVICE

(75) Inventor: Lothar Kugler, Salem (DE)

(73) Assignee: Kugler GmbH, Salem (DE)

( * ) Notice: Subject to any disclaimer, the term of this patent is extended or adjusted under 35 U.S.C. 154(b) by 134 days.

(21) Appl. No.: 10/047,609

(22) Filed: Jan. 15, 2002

(65) Prior Publication Data
US 2004/0013153 A1 Jan. 22, 2004

(30) Foreign Application Priority Data
Jan. 19, 2001 (DE) .......................... 101 02 969

(51) Int. Cl.⁷ .............................................. H01S 3/04
(52) U.S. Cl. ............................ 372/35; 372/34; 372/99; 372/107
(58) Field of Search ........................ 372/34, 35, 99, 372/107, 108; 350/63; 204/7

(56) References Cited

U.S. PATENT DOCUMENTS

| | | | | |
|---|---|---|---|---|
| 3,731,992 A | * | 5/1973 | Mansell | ....................... 359/845 |
| 4,190,327 A | * | 2/1980 | Hughes | ....................... 359/845 |
| 4,740,276 A | * | 4/1988 | Marmo et al. | ................. 205/71 |
| 5,696,786 A | * | 12/1997 | Durkin et al. | ................. 372/75 |
| 2001/0029477 A1 | * | 10/2001 | Freeman et al. | ............... 705/36 |
| 2001/0053017 A1 | * | 12/2001 | Oyama | ....................... 359/350 |
| 2002/0024977 A1 | * | 2/2002 | Asami | ......................... 372/20 |
| 2002/0027932 A1 | * | 3/2002 | Takada | ......................... 372/23 |
| 2002/0186741 A1 | * | 12/2002 | Kleinschmidt et al. | ........ 372/57 |

* cited by examiner

Primary Examiner—Leon Scott, Jr.
(74) Attorney, Agent, or Firm—Bachman & LaPointe, P.C.

(57) ABSTRACT

A cooled mirror device for laser systems or the like, comprising a main mirror body and a mirror cover rigidly connected to the main mirror body, wherein the main mirror body and/or the mirror cover have a cooling device, wherein the mirror cover is made from an aluminum material, and coated with copper or another reflection-enhancing material to form a reflection-enhancing mirror surface.

19 Claims, 2 Drawing Sheets

COOLED MIRROR DEVICE

BACKGROUND OF THE INVENTION

The present invention concerns a cooled mirror device for laser systems. Mirror devices of that kind are typically employed as reflection elements in industrial manufacturing installations using a (power) laser, for example when cutting or welding.

By virtue of a laser output power which can be in the double-digit kilowatt range, it is necessary in that situation to cool the mirror device; even mirror surfaces which are of optimum physical suitability and mechanically prepared (for example a copper surface for the wavelength of 10.6 micrometer of a $CO_2$-laser) only achieve a reflection of 99% so that the absorbed laser power has to be removed by a cooling system connected to the cooling device.

By virtue of its favourable reflection properties, copper is a known material for the production of mirror devices of the general kind set forth; it is therefore known from the state of the art for both the mirror cover (which forms the actual mirror surface) and also the main mirror body to be formed from solid copper. That does not involve any problems and is well-established in the state of the art, in particular in regard to simple and inexpensive manufacture and repair (for example by refurbishing a worn mirror surface).

That however appears to give rise to problems precisely in relation to future, laser-based processing and machining machines which are moved by high-dynamic linear motors (at feed speeds of up to 20 m/min): the high weight of cooled mirror devices of the general kind set forth, which is caused by the high specific weight of copper, not only involves increased demands in terms of load-bearing capability and the implementation of adjusting and control devices, having regard to the high speeds involved and the correspondingly high levels of acceleration, but also the dynamic vibrational behaviour of mirror devices of that kind means that it is necessary to reckon on a reduction in the speed of working cycles which can be employed in a practical context as, after each control or setting operation, a settlement procedure (which ultimately is dependent on the weight of the mirror device) first has to be effected before the laser machining unit can be used.

A further disadvantage of known mirror devices of the general kind set forth is that the cooling device—typically in the form of a duct in spiral form which is milled into the main mirror body or the mirror cover—is also a copper element. When water is used as the common cooling fluid, the result of this is that it is also only possible to use pure copper conduits or passages in a cooling circuit (with further mirror devices and other units), as otherwise, for example in a situation involving an aluminum cooling passage coupled into the cooling circuit, the otherwise known effect of the material being eaten away occurs due to cathodic or anodic action.

Therefore the object of the present invention is to improve a mirror device of the general kind set forth, in such a way that in particular the properties of such a mirror device are improved in connection with high-dynamic control motors in a laser system, without worsening the reflection properties, for example by virtue of another choice of material for a mirror surface, and without a substantially increased level of expenditure having to be accepted in terms of manufacture and production.

In addition a mirror device of the general kind set forth is to be the subject of further development to the effect that the cooling device can be operated not only in a cooling circuit with the same metal or the same metal alloy, without material damage occurring.

SUMMARY OF THE INVENTION

That object is attained by a mirror device having a mirror cover made of an aluminum material which is coated with a reflection-enhancing material to form a reflection-enhancing mirror surface.

In a manner which is advantageous in accordance with the invention, the present invention makes it possible to provide a mirror device which is suitable in particular also for high-power lasers within a laser system, which, by virtue of a markedly reduced weight, with positive reflection properties which are unchanged in comparison with a solid copper mirror device, is of optimum suitability for rapidly movable or rapidly accelerated units within modern manufacturing installations.

In addition the use of the aluminum material according to the invention has a favourable effect both in terms of production costs and also in regard to the dissipation of heat from the mirror surface. In this respect, the term 'aluminum material' is to be interpreted in the context of the present invention as not only meaning solid aluminum; but rather that definition includes any aluminum-based alloys which, with a predominant proportion of aluminum in comparison to other alloy elements, permit implementation of the perceptible weight advantage in relation to copper.

In addition, according to the respective thickness of the reflection-enhancing copper layer, it is possible either to post-machine same (without renewed coating), for example by the otherwise known use of diamond turning machines with a nanometer level of resolution, or to apply a fresh copper layer, in a particularly suitable manner by means of electrolytic procedures.

The present invention also embraces using instead of copper another material which (in comparison with the aluminum material) has a reflection-enhancing effect.

In accordance with a particularly preferred embodiment it is provided that the mirror surface is cooled by the provision of a spiral copper passage or duct in the mirror cover (in which case the passage or duct is then closed by the oppositely disposed flat side of the main mirror body); typically distilled water flows through that passage or duct as the cooling fluid, wherein an advantageous spacing between the bottom of the passage or duct and the mirror surface is between 0.1 and 1 mm in order to optimise the dissipation of heat.

In accordance with a particularly preferred embodiment of the invention a cooling fluid passage or duct has a coating afforded by means of a nickel material (nickel plating). In accordance with the invention that nickel plating involves at least all inside surfaces of the fluid passage or duct, which come into contact with the cooling fluid; in a further preferred feature however the nickel plating is effected by coating the entire surface of the inward flat side of the main mirror body and, in a further preferred feature, the oppositely disposed inside surface of the mirror cover with the passages or ducts provided therein. In this respect 'nickel material' in accordance with the invention is used to denote not only elementary nickel, but it embraces all alloys with which the advantageous effect according to the intention, namely electrochemical neutrality, can be achieved.

The use of current-less nickel has also proven to be a particularly suitable way of applying the nickel material for the nickel plating, in which respect here there are typical layer thicknesses in the range of between 10 and 100 micrometers. Current-less nickel enjoys the advantage that it can be applied in geometrically accurate manner and therefore affords in particular a uniform and homogeneous coating which can easily be produced.

While on the one hand it is particularly suitable for the mirror device which is cooled in accordance with the invention to be provided in otherwise known manner, by means of a removable adjusting plate, on the main mirror body, on or with guide units, a particularly desirable embodiment of the invention provides that the functionality of a (traditionally separate) adjusting plate is provided integrally as a component part of the main mirror body itself. That makes it possible to markedly reduce the manufacturing expenditure and accordingly the production costs without practical handling of such a unit being made more difficult, in particular upon replacement, without the need for subsequent adjustment.

Particularly with this embodiment therefore it is advantageous for the cooling device to be provided in the main mirror body itself (instead of in the mirror cover) so that as a result the mirror cover can be reduced to a thin disk or plate.

While preferred areas of use of the mirror devices according to the invention involve the wavelength region of 10.6 micrometers (corresponding to carbon dioxide lasers) and in that respect use the reflection properties of copper, which are particularly advantageous here, the present invention is not limited to that area of use but in principle is suitable for any uses which involve advantageous weight properties and/or advantageous electrochemical properties in the cooling device in conjunction with further units along a cooling line.

A particularly suitable situation of application also involves use together with otherwise known laser focusing heads, as are also produced by the applicants. In particular here it is appropriate for the mirror surface to be of an aspherical configuration, but otherwise any mirror shapes (flat, spherical or the like) can also be envisaged.

BRIEF DESCRIPTION OF THE DRAWINGS

Further advantages, features and details of the invention are apparent from the description hereinafter of preferred embodiments and with reference to the drawing in which.

DETAILED DESCRIPTION OF THE INVENTION

Figure 1:
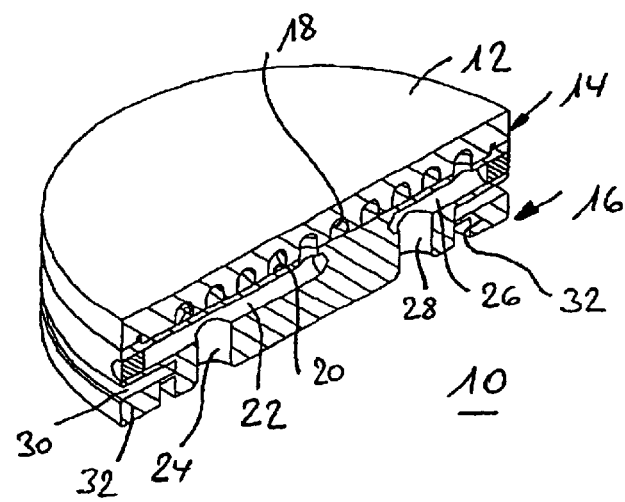
FIG. 1 is a sectional perspective view of the cooled mirror device in accordance with a first embodiment of the present invention.

As shown in FIG. 1, a cooled mirror device 10 which is optimised for a laser wavelength region of 10.6 micrometers has a mirror cover 14 which forms a mirror surface 12 and which is connected to a main mirror body 16 by glueing or soldering so as to afford an overall assembly of a flat cylindrical configuration.

At its flat side which is towards the main mirror body the mirror cover 14 has a spiral groove 18 which, in conjunction with an oppositely disposed flat inside surface 20 of the main mirror body 16, forms a cooling duct which in turn is fed at one end by a first inlet duct 22, formed in the main mirror body 16, with an inlet bore 24, and at the other end by means of a second inlet duct 26 with an inlet bore 28.

An annular groove 30 in the main mirror body 16, which extends with its walls parallel to the mirror surface 12, delimits an annular flange 32 at the bottom side. The annular flange 32 is provided, by means of fixing bores 34 provided therein, for fixing to otherwise known adjusting plates, such fixing being substantially stress-free for the mirror surface 12.

The mirror surface 12 is coated with copper to a thickness of about 0.1 mm by an electrolytic process. In addition, the cooling unit provided by the pair of inlet bores 24, 28, inlet ducts 22, 26 and the spiral groove 18 is nickel-plated over its full area, more specifically by nickel material applied in a voltage-less condition, in the described embodiment over the entire area on the inside surface 20 of the main mirror body 16 and the oppositely disposed inside surface of the mirror cover 14, which has the spiral groove 18.

Figure 3:
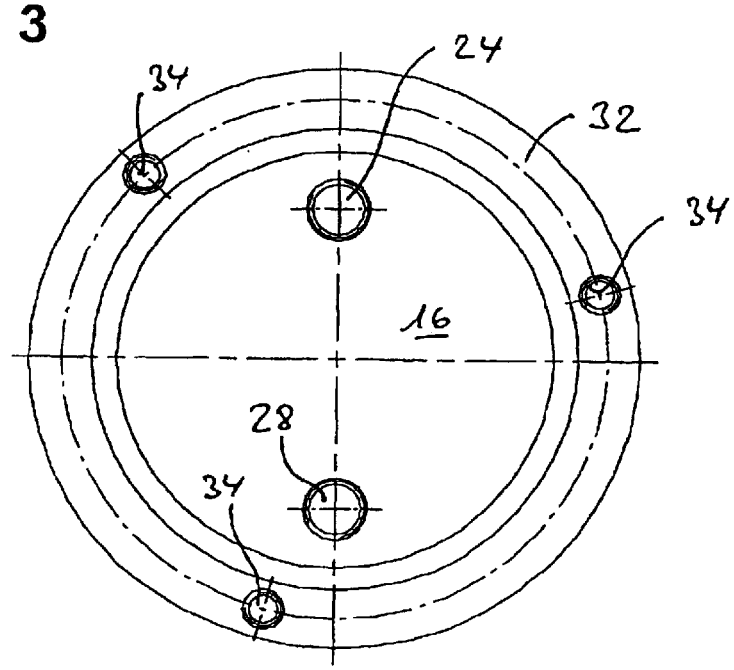
FIG. 3 is a plan view on to the bottom surface of the mirror device of FIGS. 1 and 2.

FIG. 3 clearly shows the resulting geometry from the bottom side.

This therefore affords a fluid-cooled apparatus which, in comparison with an equivalent apparatus of solid copper material, is of a weight which is reduced by about 50%. The described apparatus is thus excellently well suited in particular for use in machine environments which involve rapid movement or fast acceleration. In addition, the nickel-plated cooling duct with correspondingly nickel-plated feeds provides that, being electrochemically neutral, the arrangement can co-operate in the context of a closed, water-based coolant circuit, with practically any other units (that is to say for example also with Cu- or Al-ducts), without involving material damage to the described assembly due to anodic or cathodic effects.

An alternative embodiment of the present invention will be described hereinafter with reference to FIGS. 4 through 6, which, in comparison with the above-described embodiment, is further optimised in regard to the assemblies required for fixing and mechanical thickness.

Figure 4:
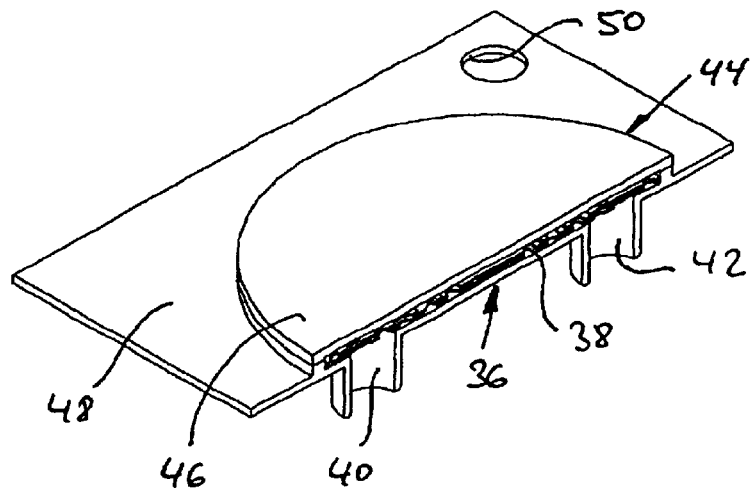
FIG. 4 is a perspective sectional view of a cooled mirror device in accordance with a second embodiment of the present invention.
Figure 5:
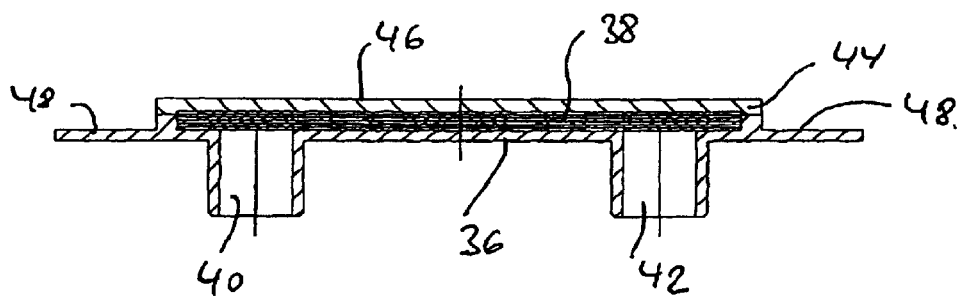
FIG. 5 is a detail view of the section surface of FIG. 4.

As FIGS. 4 and 5 show, in this case a main mirror body 36 accommodates a cooling structure formed from plate elements 38 and, by way of a pair of inlets 40, 42, affords connectibility to otherwise known feed and discharge conduits for fluid coolant.

Figure 2:
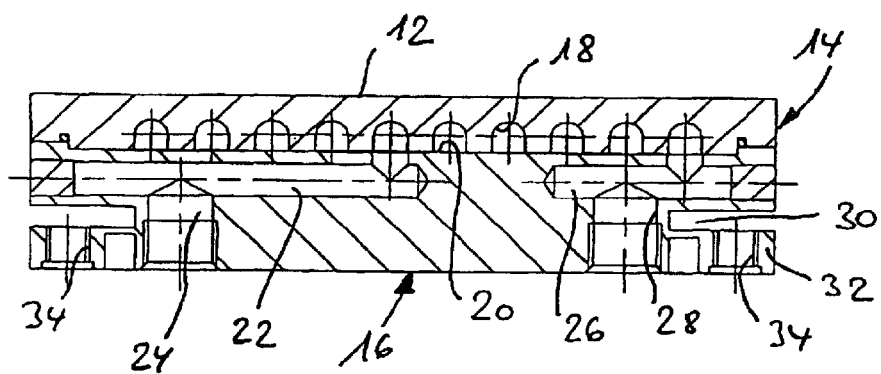
FIG. 2 is a detail view of the section surface of FIG. 1.

As shown in FIGS. 4 and 5, the main mirror body 36 is covered by a mirror cover 44 in the form of a flat, disk-shaped element which, in the described embodiment, similarly to the embodiment shown in FIGS. 1 through 3, is electrolytically copper-plated to form a mirror surface 46. Likewise the cooling system, including an inside surface of the mirror cover 44, is nickel-plated on all sides by means of current-less nickel, in which respect, as also in the above-described embodiment, a layer thickness of between about 15 and 20 micrometers was selected.

Unlike the first embodiment, this embodiment has a flange portion 48 which is of a square periphery and which projects radially beyond the mirror surface 46, being formed in one piece on the main mirror body 46. The flange portion 48 has suitable adjusting bores 50, in the manner and functionality of an adjusting plate (which is to be provided separately for the first embodiment).

Figure 6:
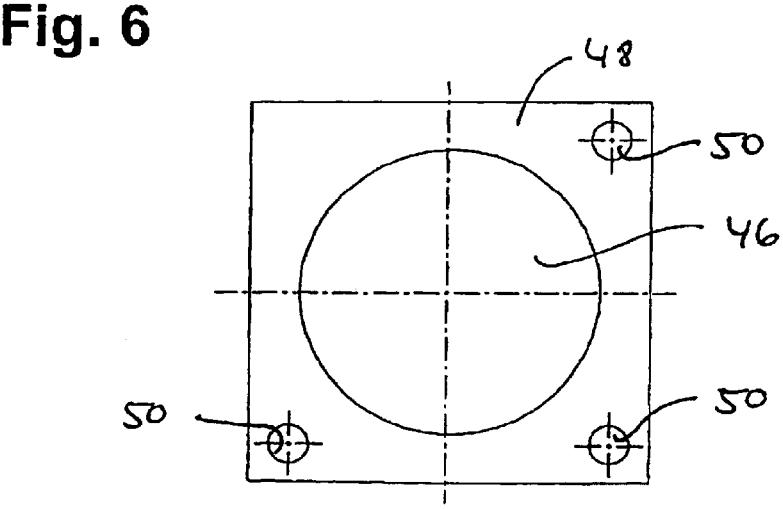
FIG. 6 is a plan view of the apparatus of FIGS. 4 and 5.

While a particularly suitable configuration of the second embodiment shown in FIGS. 4 through 6 provides for implementation from aluminum, it is here in principle possible to use any other base material as considerable savings in weight can already be achieved by virtue of the very flat, integrated design configuration.

The present invention is not limited to the embodiments described in specific terms; thus it is in principle also possible for the copper material used in accordance with the invention to afford the mirror surfaces to be replaced by another material which markedly improves the reflection properties of the base material. Equally the electrochemically neutral coating of the cooling duct, which is used in accordance with the invention, is not restricted to the use of nickel, but it is also possible to use other, suitably neutral materials.

What is claimed is:

1. A cooled mirror device, comprising
   a main mirror body and a mirror cover rigidly connected to the main mirror body, wherein at least one of the main mirror body and the mirror cover have a cooling device, wherein the mirror cover is made from an aluminum material, and is coated with a reflection-enhancing material to form a reflection-enhancing mirror surface, and an adjusting plate, removably connected to the main mirror body, is provided for fixing the mirror device on a carrier unit.

2. A device according to claim 1 wherein the main mirror body is made from the aluminum material.

3. A device according to claim 1 wherein the cooling device is a fluid cooling device comprising a spiral fluid duct in the mirror cover.

4. A device according to claim 3 wherein the fluid duct in the mirror cover is open in a direction towards an internal flat side of the main mirror body, and is closed in a connected condition of the main mirror body and the mirror cover by the flat side, wherein the fluid duct has a nickel-plating.

5. A device according to claim 4 wherein the nickel-plating extends substantially over the entire internal flat side of the main mirror body.

6. A device according to claim 4 wherein the nickel-plating is of a thickness of between 10 and 100 micrometers.

7. A device according to claim 3 wherein the fluid duct is adapted to be charged with cooling fluid by nickel-plated structures formed in the main mirror body.

8. A device according to claim 1 wherein the reflection enhancing mirror surface comprises copper.

9. A device according to claim 8 wherein the reflection-enhancing mirror surface comprises an electrolytic copper layer of a thickness of between 0.1 and 1.0 mm.

10. A device according to claim 9 wherein the reflection-enhancing mirror surface is formed after assembly of the main mirror body and the mirror cover.

11. A device according to claim 8, wherein the reflection-enhancing mirror surface comprises an electrolytic copper layer of a thickness of between 0.1 and 0.5 mm.

12. A device according to claim 1 wherein the main mirror body has a flange portion which is in the form of an adjusting plate for fixing the mirror device on the carrier unit.

13. A device according to claim 12 wherein the cooling device is provided in the main mirror body.

14. A device according to claim 1 further including, in combination, a laser system with a wavelength in the range between 10 and 11 micrometers.

15. A device according to claim 1 further including, in combination, a laser system with a wavelength in the range of 10.6 micrometers.

16. A device according to claim 1 in combination with one of a beam deflection unit of a laser system and a laser focusing head.

17. A cooled mirror device, comprising
    a main mirror body and a mirror cover rigidly connected to the main mirror body, wherein one of the main mirror body and the mirror cover has a cooling device comprising fluid duct in the mirror cover, wherein the cooled mirror is in combination with one of a beam deflection unit of a laser system and a laser focusing head.

18. A device according to claim 17 wherein an adjusting plate, removably connected to the main mirror body, is provided for fixing the mirror device on a carrier unit.

19. A device according to claim 17, wherein the fluid duct is coated with an electrochemically neutral material.

* * * * *